US012762077B2

(12) United States Patent
Ballard et al.

(10) Patent No.: US 12,762,077 B2
(45) Date of Patent: Oct. 13, 2026

(54) SECURING A DEVICE USB INTERFACE TO A BASEBOARD MANAGEMENT CONTROLLER CONNECTION BY RETRIEVING PORTIONS OF DATA FROM FIELD REPLACEABLE UNIT (FRU)

(71) Applicant: DELL PRODUCTS L.P., Round Rock, TX (US)

(72) Inventors: Lee E. Ballard, Georgetown, TX (US); Jonathan Foster Lewis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 19/009,370

(22) Filed: Jan. 3, 2025

(65) Prior Publication Data

US 2026/0195280 A1 Jul. 9, 2026

(51) Int. Cl.
*G06F 13/00* (2006.01)
*G06F 13/38* (2006.01)
*G06F 13/42* (2006.01)

(52) U.S. Cl.
CPC ........ *G06F 13/382* (2013.01); *G06F 13/4282* (2013.01); *G06F 2213/0042* (2013.01)

(58) Field of Classification Search
CPC ..... G06F 13/382; G06F 13/4282; G06F 13/00
See application file for complete search history.

(56) References Cited

U.S. PATENT DOCUMENTS 10,268,616 B2 4/2019 Montero et al.
12,293,175 B2 * 5/2025 Chang ........................ G06F 8/65
2008/0244108 A1 10/2008 Abramson et al.
2015/0076910 A1 * 3/2015 Wang ........................ H02J 1/04 307/52
2019/0250689 A1 * 8/2019 Ivanov ...................... H02J 1/14
2025/0238059 A1 * 7/2025 Yu ........................... G06F 1/266

* cited by examiner

*Primary Examiner* — Tammara R Peyton
(74) *Attorney, Agent, or Firm* — Larson Newman, LLP

(57) ABSTRACT

An information handling system includes Universal Serial Bus (USB) devices and a baseboard management controller. Each USB device is coupled to a USB interface. The controller gathers an inventory of the USB devices, determines that a first portion of the USB devices are valid USB devices and in response enables the first portion of the USB devices, and determines that a second portion of the USB devices are not valid USB devices and in response disables the second portion of the USB devices.

16 Claims, 3 Drawing Sheets

SECURING A DEVICE USB INTERFACE TO A BASEBOARD MANAGEMENT CONTROLLER CONNECTION BY RETRIEVING PORTIONS OF DATA FROM FIELD REPLACEABLE UNIT (FRU)

FIELD OF THE DISCLOSURE

This disclosure relates to information handling systems, and more particularly relates to securing a device USB interface to a baseboard management controller connection in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include universal serial bus (USB) devices coupled to a USB interface. A baseboard management controller may gather an inventory of the USB devices, determine that a first portion of the USB devices are valid USB devices and in response enable the first portion of the USB devices, and determine that a second portion of the USB devices are not valid USB devices and in response disable the second portion of the USB devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
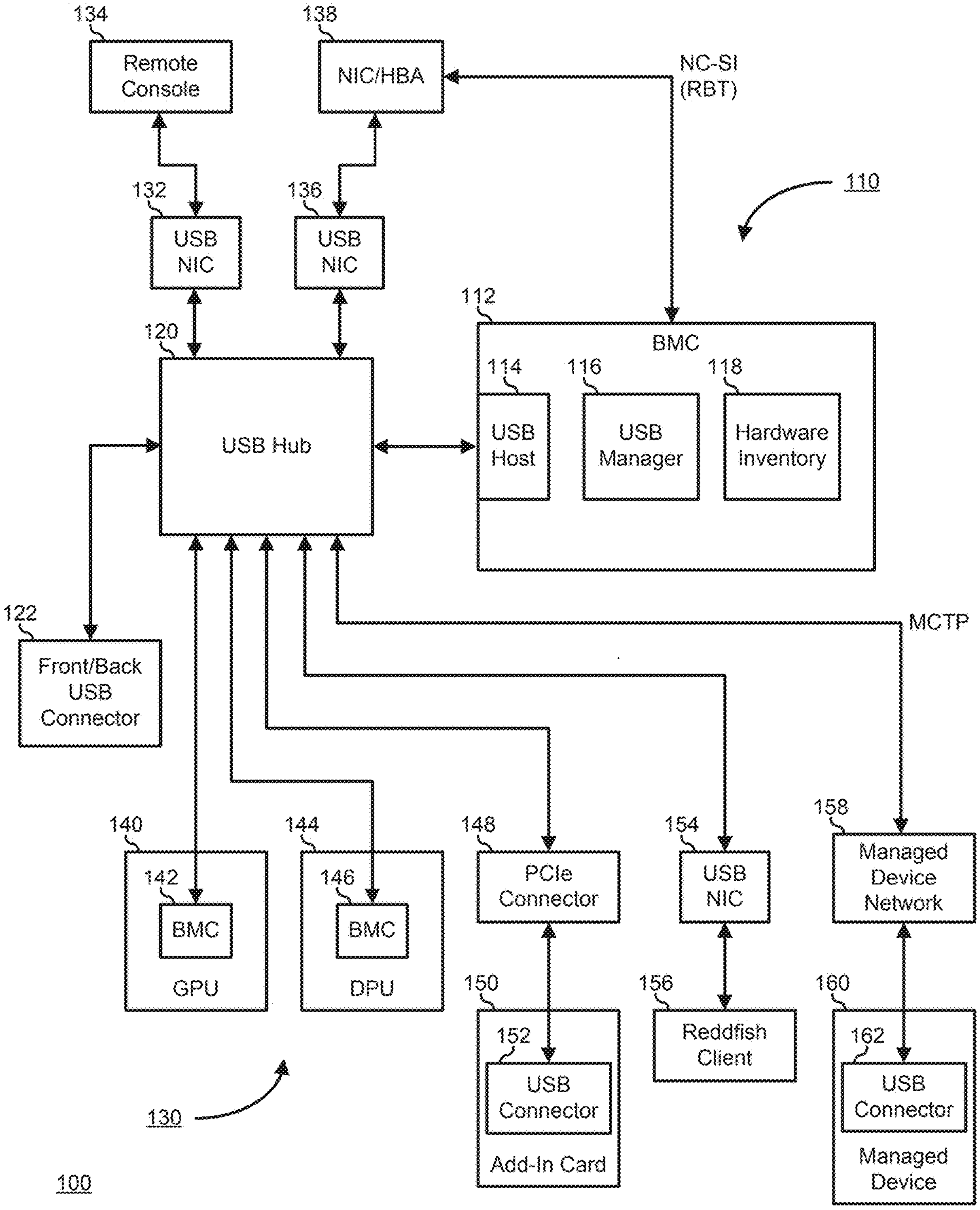
FIG. 1 illustrates an information handling system according to an embodiment of the present disclosure.

FIG. 1 illustrates an information handling system 100, including a management system 110 and managed devices 130, and will be further understood to include a hosted environment (not illustrated). Management system 110 includes a baseboard management controller (BMC) 112 and a Universal Serial Bus (USB) hub 120. Management system 110 provides management services to information handling system 100, including monitoring, managing, and maintaining the elements of the information handling system and the hosted environment. As such BMC 112 represents a separate processing system configured to operate out of band from the hosted environment. Management system 110 may include additional components, such as memory devices, logic devices, or the like, as needed or desired.

BMC 112 includes a USB host 114, a USB manager 116, and a hardware inventory 118. USB host 114 represents a central node that manages a USB network of connected USB devices, as described further below. In this regard, USB host 114 manages communication on the USB network but issuing communication requests to which the connected USB devices respond. USB manager 116 and hardware inventory 118 will be described further below.

USB interfaces have not been central in the management environment of an information handling system, typically being limited to the presence of a USB type connector on a front or a back side of a server to permit an administrator to access the system's BMC. However, more recent trends have shown increasing reliance on USB interfaces in the management environments of information handling systems, as such interfaces are faster and less expensive to implement, both in terms of cost and of layout space on a printed circuit board (PCB). As such, USB interfaces are being utilized to supplement or replace Network Controller Sideband Interface (NC-SI) signaling between the BMC and a network interface card (NIC) or host bus adaptor (HBA). A USB interface may be provided in place of the typical Reduced Media Independent Interface (RMII) Bus Topology (RBT) bus. Such a USB channel can operate to provide NC-SI management and passthrough transactions. USB interfaces may further be connected as USB NICs to subordinate other management controllers, such as BMCs on other processing devices, or to connect to a UEFI Redfish client, over a network that is internal to the information handling system. The other processing devices may include graphics processing units (GPUs), data processing units (DPUs), or the like.

USB interfaces may further be utilized to provide Management Component Transport Protocol (MCTP) transactions to manage various devices of the information handling system. For example, a USB interface may provide Platform Level Data Model (PLDM)-based firmware updates and Asynchronous Event Notification (AEN) messaging. In a particular case, a USB interface, acting as a serial interface can provide remote console access to other processing devices, including MCTP-over-serial communications, may be provide as an Inter-Integrated Circuit (I2C) or Improved Inter-Integrated Circuit (I3C) interface replacement. Further, many add-in devices may include USB interfaces that are accessible to the BMC, either via a high-speed data communication interface to the hosted environment, or via dedicated USB interface connectivity with the add-in devices.

Managed devices 130 include a remote console 134, a NIC/HBA 138, a GPU 140 a CPU 144, a PCIe add-in card 150, a Redfish client 156, and one or more additional managed device 160. USB hub 120 is connected upstream to USB host 114 in BMC 114, and is connected downstream to the managed devices 130. In particular, a USB NIC 132 is connected upstream to USB hub 120 and is connected downstream to remote console 134. A USB NIC 136 is connected upstream to USB hub 120 and is connected downstream to NIC/HBA 138. Here, USB NIC 136 operates to provide NC-SI management and passthrough transactions to NIC/HBA 138. Note that BMC 112 is further illustrated as being directly connected to NIC/HBA 138 via a RBT interface to provide an alternate path for NC-SI management and passthrough transactions, as needed or desired. A BMC 142 in GPU 140, and a BMC 146 in DPU 144 are connected upstream to USB hub 120.

PCIe add-in card 150 is installed into a PCIe connector 148 to provide a high-speed data communication interface between the hosted environment and the PCIe add-in card. However, for the purposes of the current disclosure, PCIe connector 148 may be understood to represent a USB interface included in the PCIe connector, or other side-band interfaces, as needed or desired. In this regard, a USB connector 152 of PCIe add-in card 150 is connected upstream to USB hub 120 via PCIe connector 148. A USB NIC 154 is connected upstream to USB hub 120 and is connected downstream to Redfish client 156. A USB connector 162 of managed device 160 is connected upstream via a managed device network 158 to USB hub 120. Finally, USB hub 120 includes a downstream connection to a USB connector 122 on a front or a back side of information handling system 100 to permit an administrator to access BMC 112.

It has been understood by the inventors of the current disclosure that the proliferation of USB interfaces in the management architecture of an information handling system as described above may lead to increased attack surfaces for malicious activities targeted toward the BMC. For example, attacks targeted at USB interfaces are common, and may include such attacks as BadUSB, Rubber Ducky, or the like. Such attacks may be utilized to gain control of the BMC and thereby open up the information handling system to a wide variety of additional malicious activity. In a particular case, the attacks are initiated when an infected USB device, such as a USB thumb drive, is inserted into an open USB connector on the information handling system. In other cases, where the USB interface is internal to the information handling system, such as the USB connections to a GPU, a DPU, a PCIe add-in card, or the like, firmware code of the connected device may be infected with an attack, and may gain access to the BMC. In particular, some connected devices may include multiple USB functions, not all of which are consumed by the BMC. Described further below is a mechanism to manage and limit the USB connectivity with the BMC.

USB manager 116 represents a software stack instantiated on BMC 112 that operates to implement policies for managing and limiting USB device access to the BMC. In current examples, such as the USBGuard software stack, USB access may be limited based on the attributes of the connected USB device. However, such current examples may lack the robustness to fully secure a device such as a BMC that has such unfettered access to the hardware and firmware of an information handling system. In a particular embodiment, USB manager 116 is extended to consume a much richer cache of system information in implementing the policies for managing USB device access. In particular, USB manager 116 accesses information from inventory log 118 to correlate multiple sources of information related to the USB network topology and the connected USB devices in determining the policy implementations. In particular, the information stored in inventor log 118 far exceeds the attribute information provided by the USB devices.

In particular, inventory log 118 utilizes multiple discovery mechanisms implemented by information handling system 100 and by BMC 112. On the hosted environment side, information handling system 100 may perform PCIe Bus/Device/Function (BDF) discovery, USB discovery, and gather other initialization information related to the USB topology of the information handling system at system boot. Such initialization information is collected by BMC 112 and stored in inventory log 118. In addition, BMC 112 may determine information related to the physical device, such as Field-Replaceable Unit (FRU) information like a device manufacturer, a device manufacturing date, a device serial number, or other information which may serve to identify a particular example of the device and to differentiate the device from another similar example of the device. In this way, a same type of device, but a different example of that device can be distinguished from an original example of the device. Other information gathered by BMC 112 includes internal device settings and configurations retrieved from the device, I2C-based NC-SI/PLDM discovery, Security Protocol and Data Model (SPDM) authentication, user configuration input, and the like.

USB manager 116 then operates to create, implement, and manage the policies for USB device access with BMC 112. Example policies may include blocking all Human Interface Devices (HIDs) on all USB connectors, limiting USB MCTP functions to one function per device, requiring matching serial numbers or other FRU information with a known USB device, allowing USB NIC connections only with network devices such as NIC/HBA 138 or with subordinate BMCs 142 and 146, allowing USB connections only with devices that are authenticated via SPDM, or the like. Example policies may further be defined based upon an inventory of PCIe devices with USB functions, an inventory of system management devices (e.g. RBT, SMBUS, or the like) with USB functions, or the like. For example, SPDM version 1.3 includes features that return PCIe information such as CLASS VID, PID, or the like.

Figure 2:
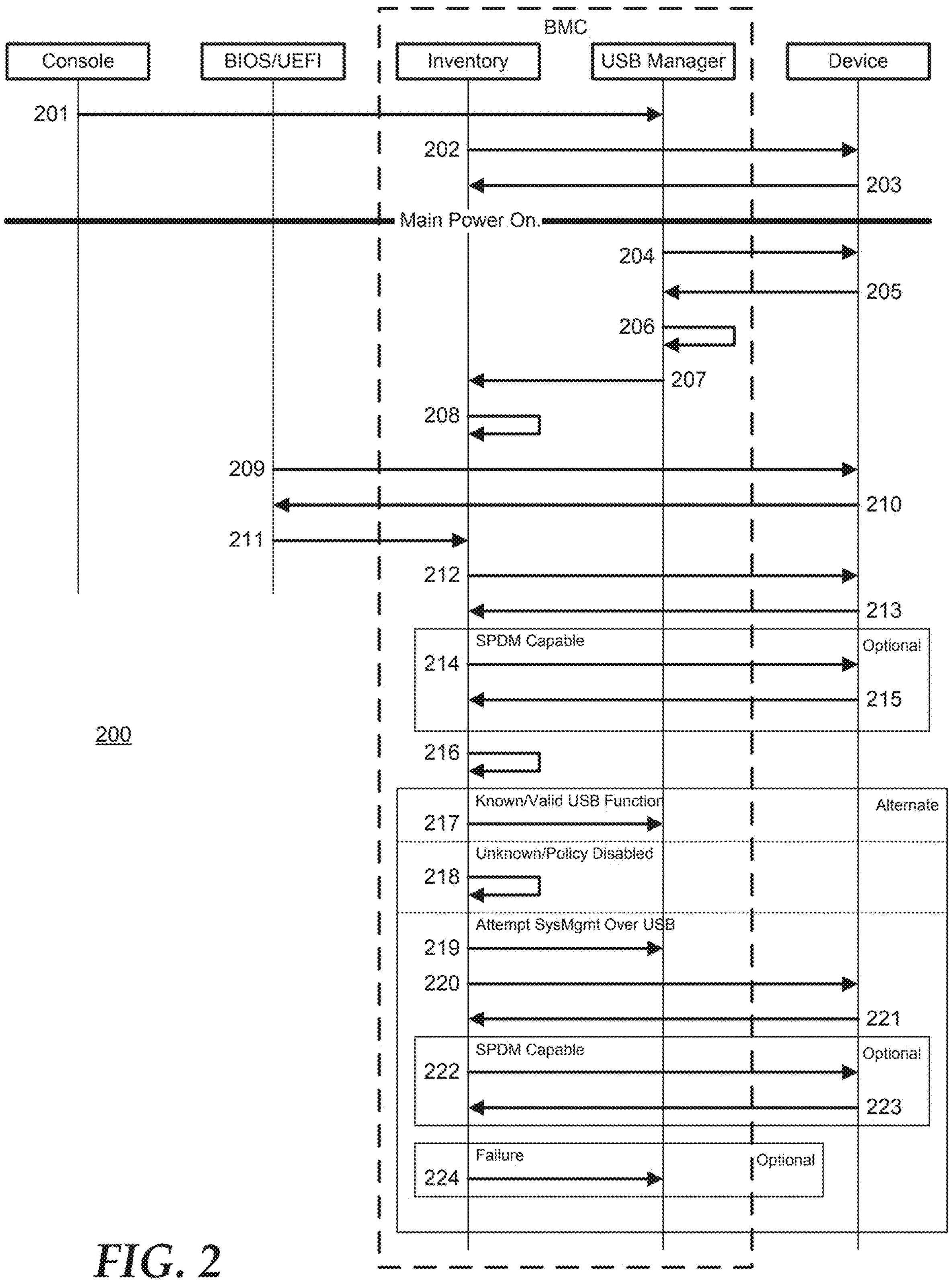
FIG. 2 is a flowchart showing a method for securing a device USB interface to a baseboard management controller connection in an information handling system according to an embodiment of the present disclosure.

FIG. 2 illustrates a method 200 for securing a device USB interface to a baseboard management controller connection in an information handling system. In a first step 201, a user can utilize a console to modify a default policy in the USB manager. For example, the policy may be set up to lock a current HW configuration so that any new USB devices would be ignored, to disable system management over USB, to include exceptions for various USB devices that would otherwise be blocked, or other policy changes as needed or desired. In step 202, prior to booting the system, an inventory collection process on the BMC collects PCIe adapter FRU information. In step 203, the device provides the FRU information to the inventory. Example FRU information may include a device manufacturer, model, or serial number. In addition, the BMC may include an internal database of well-known device which may include further information on on valid USB functions (NIC, Serial, MCTP, etc.) for the device. Method steps 201-203 may be performed prior to powering on the information handling system.

After the information handling system is powered on, the USB devices become discoverable, and the BMC manager requests USB descriptors from the USB devices in step 204. In step 205, the USB device will return the USB descriptors to the USB manager. For example, the USB descriptors may include a vendor ID, a product ID, a serial number, or the like. In step 206, the USB manager blocks USB devices that are not whitelisted, such as USB devices that are not integrated with the BMC, such as in a BMC system-on-a-chip (SoC). Here, blocked USB devices are left in an unconfigured state and no device drivers are loaded for the blocked USB devices, rendering the blocked USB devices unusable. In step 207, the BMC manager provides an notification that a new USB device was added at a particular USB port/location, along with the collected attributes. In step 208, the notification will be queued for later processing if the inventory has not yet collected all information to be associated with the USB port where the USB device was added. For example, the USB device port may be associated with a PCIe slot and the PCIe inventory has not been collected yet (i.e., when PCIe enumeration is not completed).

When the system BIOS/UEFI comes up after the system is powered on, the BIOS/UEFI enumerates the host PCIe devices in step 209. In step 210, the PCIe devices return PCIe information, such as a device ID, a vendor ID, a subsystem ID, a subsystem vendor ID, a serial number, or the like. In step 211, the BIOS/UEFI updates the inventory. In step 212, the inventory discovers devices on systems management interfaces, such as I2C interfaces, RBT interfaces, NC-SI interfaces, PLDM interfaces, or the like, and in step 213, the inventory information is collected and correlated with USB device ports.

In step 214, USB devices that are SPDM capable (i.e., over I2C interfaces, PCIe VDM, or the like), then the BMC requests device certificate and firmware measurements to assure authenticity and validation. The SPDM capable USB devices provide their hardware and firmware validity in step 215. In step 216, when all retrievable information that can be correlated with a USB port is collected the USB device add request received on DBUS is retrieved from queue.

In step 217, the BMC determines whether a particular USB device is a whitelisted device, and if so, sends a request to the USB manager to unblock the USB device. For example, a whitelisted USB device may be an internal, well-known USB device based upon the database, or all policy conditions may be met by the USB device. In step 218, the BMC further determines whether a particular USB device is an unknown device, or if the USB device is to be disabled based upon the policy, and the inventory determines that no further action to initialize the USB device is to be taken. In step 219, the BMC further determines whether the USB device supports systems management over USB, such as USB NIC, RBT, MCTP over USB, or the like. Here, the BMC operates to conditionally unblocked the USB device for further inspection. In this case, in step 220, discovery of the USB device is performed over NC-SI, PLDM, or the like, and in step 221, the inventory information and capability information is retrieved from the USB device. In step 222, the BMC determines whether a particular USB device is SPDM capable and requests the USB device certificate and firmware measurements. Here, in step 223, the USB device uses SPDM to prove its hardware and firmware validity. Finally, in step 224, the BMC determines whether additional information is unavailable for retrieval, or if a USB device otherwise fails to satisfy policy constraints, and the BMC manager places the USB device back into a blocked state.

Figure 3:
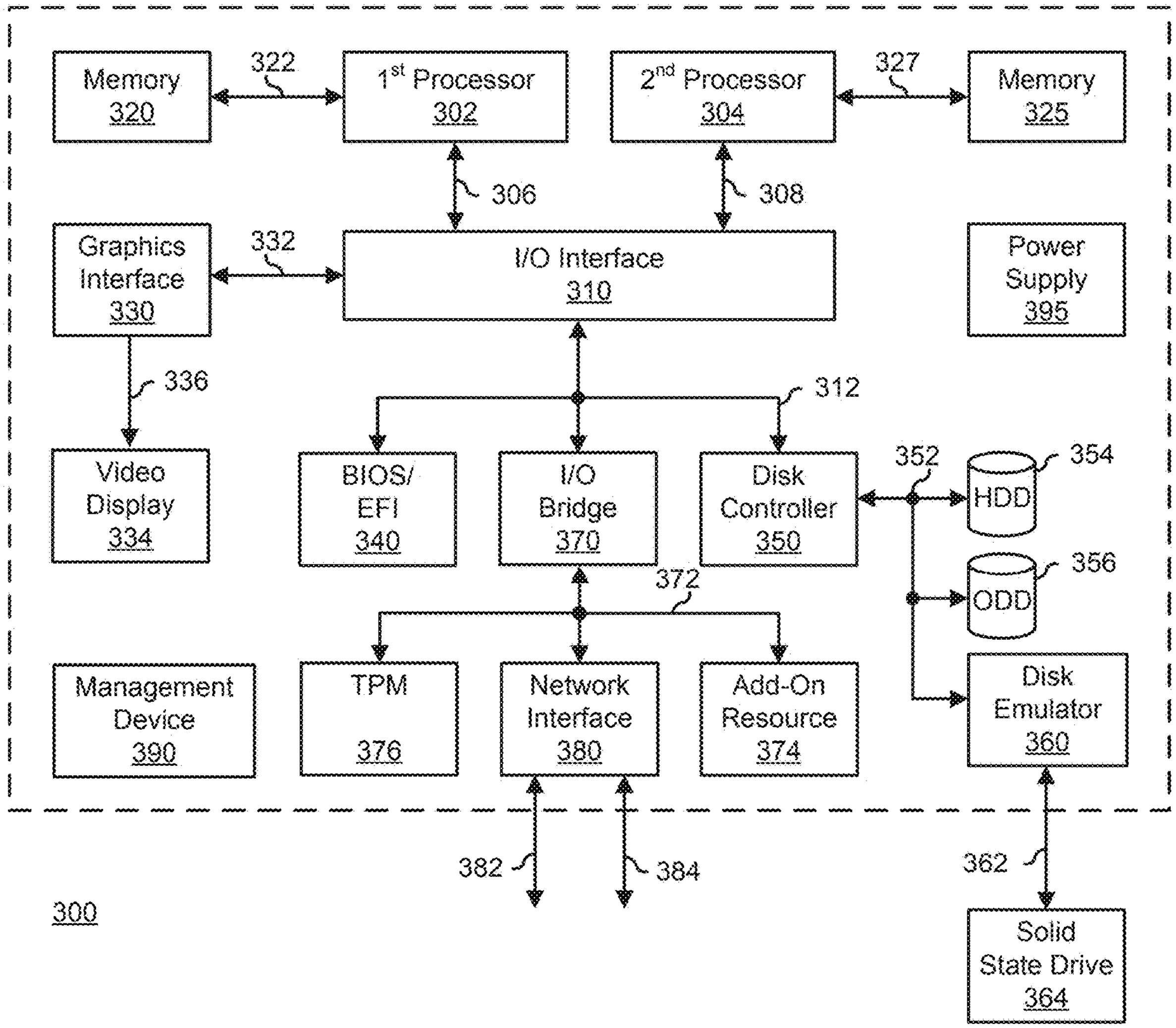
FIG. 3 is a block diagram illustrating a generalized information handling system according to another embodiment of the present disclosure.

FIG. 3 illustrates a generalized embodiment of an information handling system 300 similar to information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 where peripheral interface 372 and the I/O channel are of the same type, and the I/O bridge translates information from a format suitable to the I/O channel to a format suitable to the peripheral channel 372 where they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 where the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed:

1. An information handling system, comprising:

a plurality of universal serial bus (USB) devices, each USB device coupled to a USB interface; and a baseboard management controller (BMC) configured to gather an inventory of the USB devices, to determine that a first portion of the USB devices are valid USB devices and in response to enable the first portion of the USB devices, and to determine that a second portion of the USB devices are not valid USB devices and in response to disable the second portion of the USB devices, wherein in gathering the inventory of the USB devices, the BMC is further configured to retrieve Field Replaceable Unit (FRU) information from the USB devices, and wherein in determining that the first portion of the USB devices are valid, the BMC is further configured to determine that the FRU information for the first portion of the USB devices matches expected FRU information for the USB devices.

2. The information handling system of claim 1, wherein in determining that the second portion of the USB devices are not valid USB devices, the BMC is further configured to determine that the FRU information for the second portion of the USB devices does not match the expected FRU information.

3. The information handling system of claim 2, wherein the FRU information includes a device manufacturer, a device manufacturing date, and a device serial number.

4. The information handling system of claim 1, wherein, in determining that the first portion of the USB devices are valid, the BMC is further configured to determine that the first portion of the USB devices are provided on a system-on-a-chip (SoC) associated with the BMC.

5. The information handling system of claim 1, wherein, in determining that the first portion of the USB devices are valid, the BMC is further configured to determine that the first portion of the USB devices are authenticated USB devices.

6. The information handling system of claim 5, wherein the authenticated USB devices are authenticated by a Security Protocol and Data Model (SPDM) authentication.

7. The information handling system of claim 1, wherein the BMC is further configured to receive an authentication for a first USB device of the second portion of the USB devices, and to add the first USB device to the first portion of the USB devices in response to receiving the authentication.

8. The information handling system of claim 1, wherein, in determining that the second portion of the USB devices are not valid, the BMC is further configured to determine that the second portion of the USB devices are associated with USB connectors.

9. The method of claim 1, further comprising:

receiving an authentication for a first USB device of the second portion of the USB devices; and adding the first USB device to the first portion of the USB devices in response to receiving the authentication.

10. A method, comprising:

providing, on an information handling system, a plurality of Universal Serial Bus (USB) devices, each USB device coupled to a USB interface;

gathering, by a baseboard management controller (BMC) of the information handling system, an inventory of the USB devices wherein in gathering the inventory of the USB devices, the BMC is further configured to retrieve Field Replaceable Unit (FRU) information from the USB devices;

determining that a first portion of the USB devices are valid USB devices and in response enabling the first portion of the USB devices, wherein in determining that the first portion of the USB devices are valid, the BMC is further configured to determine that the FRU information for the first portion of the USB devices matches expected FRU information for the USB devices; and determining that a second portion of the USB devices are not valid USB devices and in response disabling the second portion of the USB devices.

11. The method of claim 10, wherein in determining that the second portion of the USB devices are not valid USB devices, the method further comprises determining that the FRU information for the second portion of the USB devices does not match the expected FRU information.

12. The method of claim 11, wherein the FRU information includes a device manufacturer, a device manufacturing date, and a device serial number.

13. The method of claim 10, wherein in determining that the first portion of the USB devices are valid, the method further comprises determining that the first portion of the USB devices are provided on a system-on-a-chip (SoC) associated with the BMC.

14. The method of claim 10, wherein in determining that the first portion of the USB devices are valid, the method further comprises determining that the first portion of the USB devices are authenticated USB devices.

15. The method of claim 14, wherein the authenticated USB devices are authenticated by a Security Protocol and Data Model (SPDM) authentication.

16. An information handling system, comprising:

a plurality of Universal Serial Bus (USB) devices, each USB device coupled to a USB interface; and a baseboard management controller (BMC) configured to gather an inventory of the USB devices, to determine that a first portion of the USB devices are valid USB devices and in response to enable the first portion of the USB devices, and to determine that a second portion of the USB devices are not valid USB devices and in response to disable the second portion of the USB devices, wherein in gathering the inventory of the USB devices, the BMC is further configured to retrieve field replaceable unit information from the USB devices, and wherein in determining that the second portion of the USB devices are not valid, the BMC is further configured to determine that the second portion of the USB devices are associated with USB connectors, wherein in gathering the inventory of the USB devices, the BMC is further configured to retrieve Field Replaceable Unit (FRU) information from the USB devices, and wherein in determining that the first portion of the USB devices are valid, the BMC is further configured to determine that the FRU information for the first portion of the USB devices matches expected FRU information for the USB devices.

* * * * *